Figure 5:
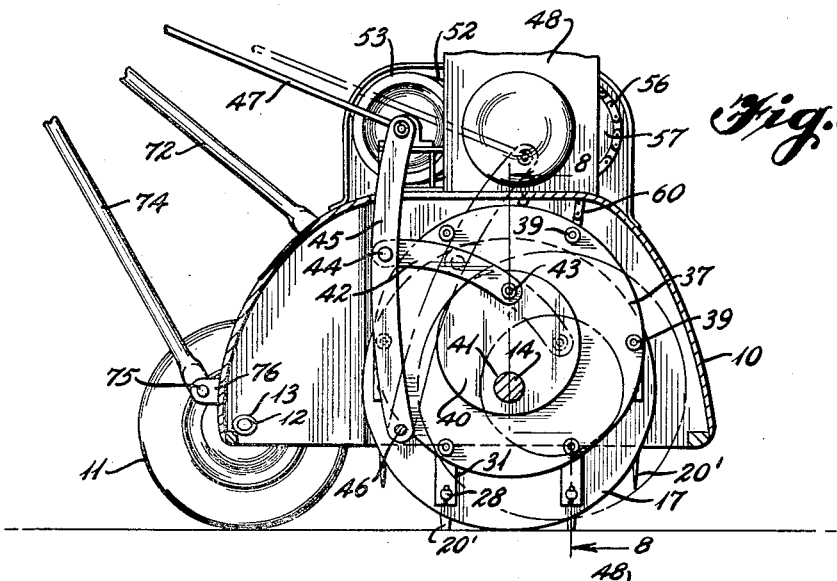

Sept. 15, 1964
W. P. LUNSFORD
3,148,737
AERATOR
Filed Sept. 13, 1963
4 Sheets-Sheet 1
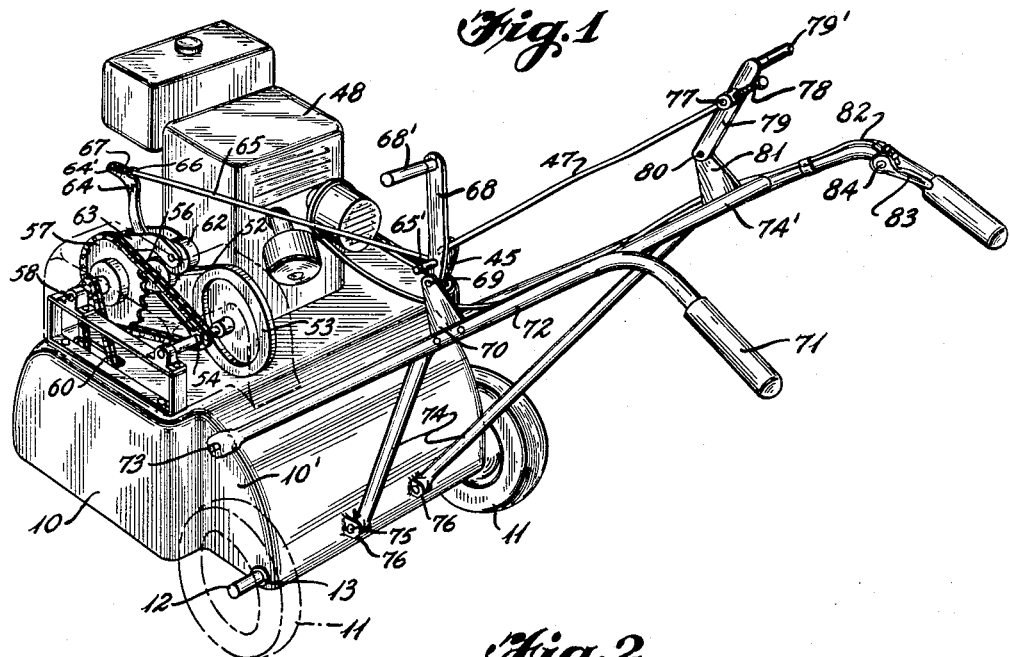
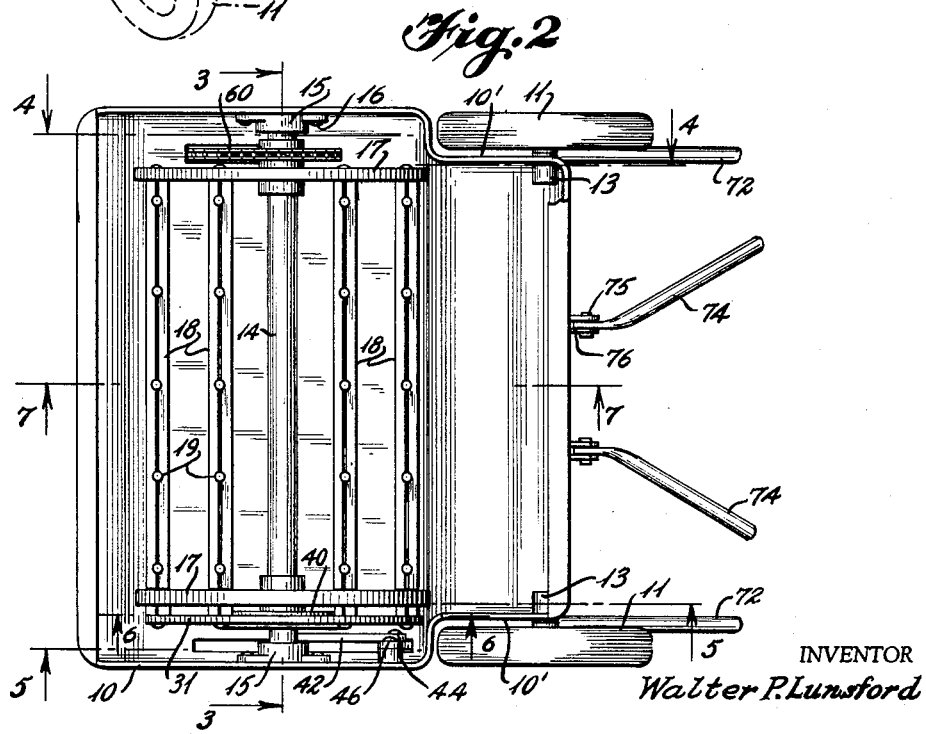
INVENTOR
*Walter P. Lunsford*
BY
ATTORNEY Sept. 15, 1964 W. P. LUNSFORD 3,148,737
AERATOR
Filed Sept. 13, 1963 4 Sheets-Sheet 2
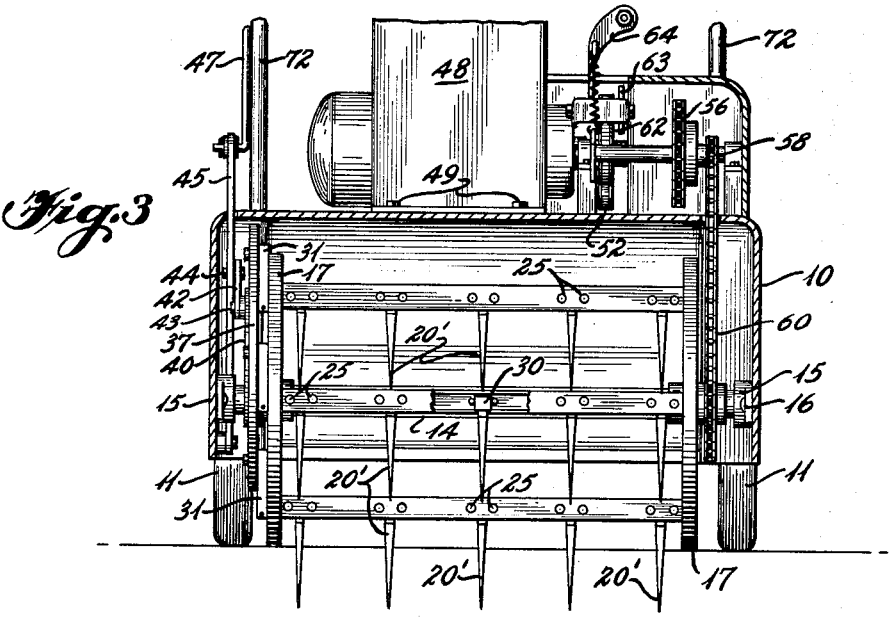
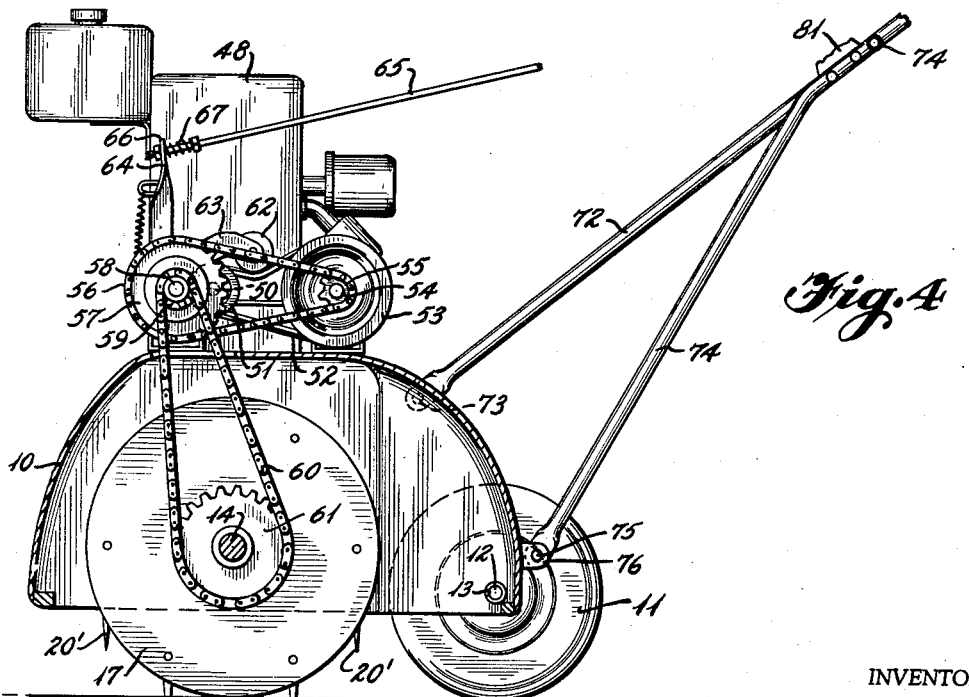
INVENTOR
Walter P. Lunsford
BY
ATTORNEY INVENTOR
Walter P. Lunsford
BY
ATTORNEY Sept. 15, 1964  W. P. LUNSFORD  3,148,737
AERATOR
Filed Sept. 13, 1963  4 Sheets-Sheet 4
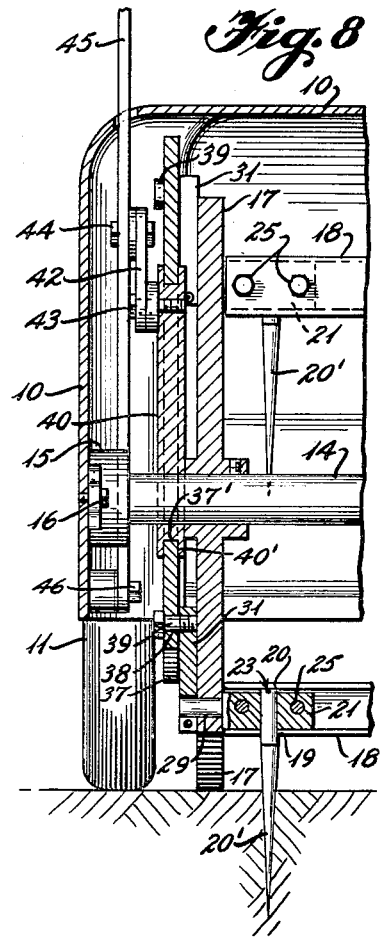
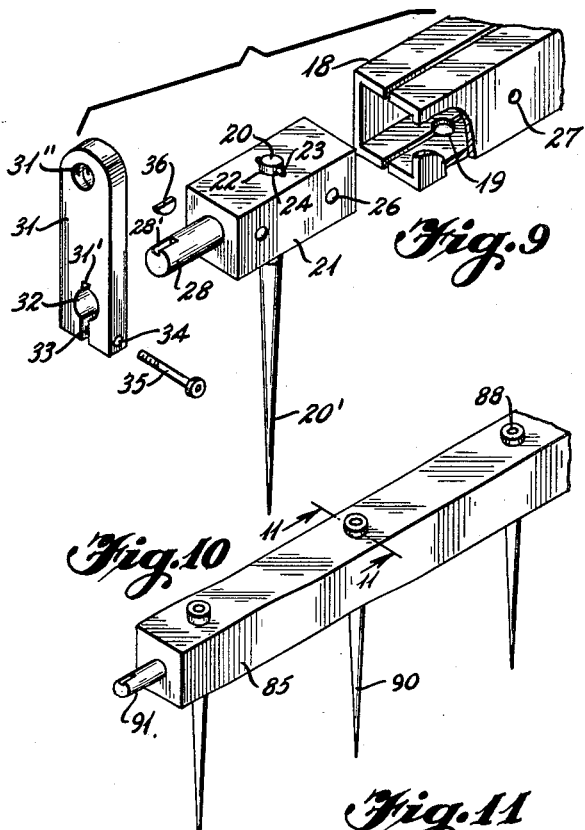
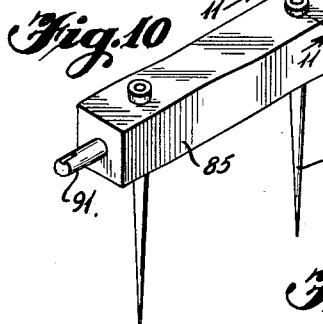
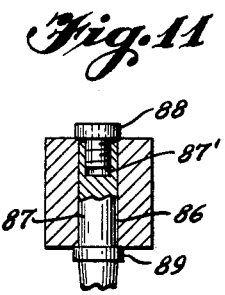
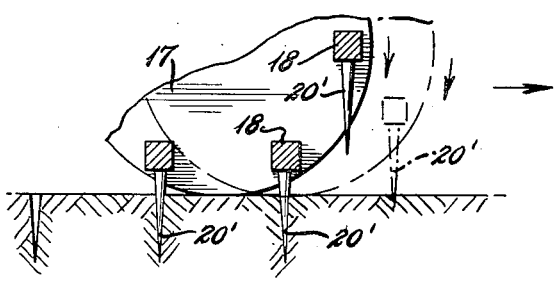
INVENTOR
Walter P. Lunsford
BY
ATTORNEY 3,148,737
AERATOR
Walter P. Lunsford, 1112 Homesdale Road, Jacksonville, Fla., assignor of forty-nine percent to Grant Roy, Atlanta, Ga.
Filed Sept. 13, 1963, Ser. No. 308,857
6 Claims. (Cl. 172—21)

This invention relates to agriculture, to apparatus and equipment employed in the cultivation and care of plants of various kinds, including grass, shrubs, trees, and the like, and to the manner of promoting or accelerating growth, development and maturity of such plants.

The invention relates particularly to the facilitation of the natural processes including the supplying of water, air, plant food and other substances necessary for the growth, development, protection and nourishment of plants, and especially to apparatus by which additional passageways can be produced in the earth crust through which water, plant food or other substances can reach the roots of plants.

Devices have been produced for perforating the sometimes relatively hard surface soil to allow air and water, with or without plant food, to reach the tiny hairs or feeder roots of plants including grass, shrubs and the like, but these devices have not been fully satisfactory because of their cost, their complicated construction, because their tines, spikes, prongs or other penetrating elements disturbed the soil and plant life, and because much power was required for their control as well as for their operation, with resultant damage to the root structure and to the machine itself. Prior devices have been easily damaged because they contained an element of danger or were a hazard to the operators as well as to persons near the scene of operation, and had their turf penetrating prongs or tines mounted rigidly and operated with improperly applied stress.

It is an object of the invention to provide a simple, inexpensive machine which can be manufactured or repaired from readily available materials, in which the operating parts are guarded on all sides and which can be easily, practicably and efficiently operated with minimum power.

Another object of the invention is to provide an earth perforating machine having penetrating elements which assist in supporting the weight of a machine driven by a relatively small power plant and serving not only to force the prongs or tines into the earth but to propel the machine along the surface on which it is operated regardless of whether level or inclined.

Another object of the invention is to provide tines, pentrating spikes, or prongs which can be readily installed and replaced in a minimum of time by an unskilled operator and which tines are mounted for slight motion so that they will have great durability and will not readily be broken.

Figure 6:
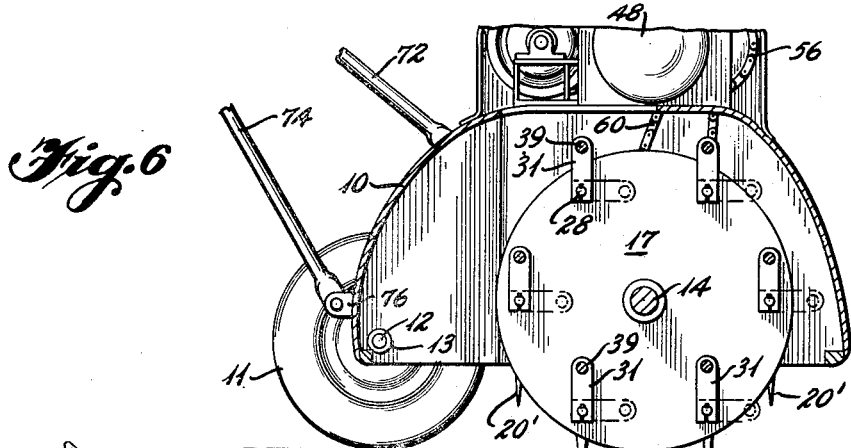
Figure 7:
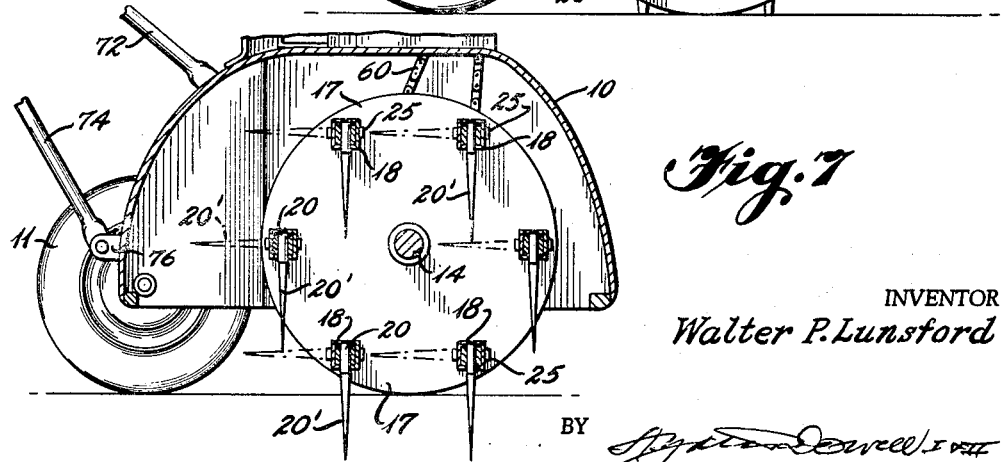

Other objects and advantages of the invention will be apparent from the following description taken in conjunction with the accompanying drawings wherein:

FIG. 1 is a perspective illustrating one application of the invention;
FIG. 2, a bottom plane view;
FIG. 3, a vertical section on the line 3—3 of FIG. 2;
FIG. 4, a similar view at right angles to that of FIG. 3 and on the line 4—4 of FIG. 2;
FIG. 5, a vertical section on the line 5—5 of FIG. 2;
FIG. 6, a vertical section on the line 6—6 of FIG. 2;
FIG. 7, a vertical section on the line 7—7 of FIG. 2;
FIG. 8, a vertical section on the line 8—8 of FIG. 5;
FIG. 9, an exploded perspective of the prong holding bar and its oscillating arm;
FIG. 10, a perspective of a modified type of bar;
FIG. 11, a section on the line 11—11 of FIG. 10; and
FIG. 12, a fragmentary diagrammatic illustration of the manner in which the prongs engage the soil in which the perforations are made.

Briefly stated the invention is a machine resembling somewhat in appearance a lawn mower but it is of a construction to produce holes or perforations of a spacing found to be practical, approximately four inches apart and sixteen of such holes per square foot, for the purpose of increasing the supply of air and water through the roots of plants for circulation in the plant system somewhat like that produced by a pump. The machine has a housing supported by wheels and within the housing is a rotary perforator or hole producer of spaced wheel forming disks with parallel bars pivoted around the disks near the circumference, six of such being found suitable, each bar carrying perforating projections, prongs or tines with controlling means for maintaining the prongs carried by each of the parallel bars in vertical position except when it is desired to swing them 90° in not penetrating position.

It will be understood the machine is supported by four wheels two of usual construction and two of which are the end members which carry the bars of the rotary perforator between them and which latter two wheels are driven through reduction gearing by an internal combustion or other engine mounted on the cowl to thus propel the machine and provide weight for forcing the perforating prongs into the earth.

The machine also is provided with a pair of handles with multiple controls, one for the speed of the motor, one for forward or reverse movement of the machine, and a third to clutch and declutch the drive from the engine of the machine.

With continued reference to the drawings, the aerator or machine for producing holes in the earth's crust in accordance with the present invention comprises an open-bottomed housing 10 supported at one end by wheels 11 on shafting 12. The shafting 12 is mounted in bearing sleeves 13 in the rear of the housing and may be in the form of stub shafts, one at each side of the rear of the housing instead of a single shaft for the purpose of conserving material. The housing 10 is provided with inset portions 10' to accommodate the wheels 11 in order to obtain maximum compactness and with as little excess space as possible in the width of the operating mechanism.

The main portion of the housing is of generally rectangular construction of a width greater than the front to rear dimension and within this generally rectangular housing forwardly of shafting 12 is located a shaft 14 having its ends mounted in bearings 15 secured to parallel side portions of the housing by rivets 16. A pair of spaced drive wheel forming disks 17 are fixed or keyed to the shaft housing 14 and these with the wheels 11 provide a 4-wheel mounting for the machine. As is apparent in FIGS. 4 and 5 the major portion of the weight of the machine is carried by the wheels 17, the wheels 11 functioning essentially as auxiliary wheels to stabilize the machine and assure the proper angular disposition of the aerator prongs relative to the ground to perform their aerator function.

Between the disks or wheels 17 are located a series of opposed pairs of channel members 18, each pair of channel members providing a prong mounting bar. The channel members are disposed with their flanges in close opposition and have their flanges at one side provided with opposed semi-circular openings 19 for the relatively free reception of cylindrical tines or prongs 20 with tapered piercing points 20' (FIG. 9). Each pair of channel members forming the bar mounted in the wheel forming disks 17 may carry a desired number of penetrating tines or prongs, five being found to be a convenient number. These prongs are located approximately four inches apart and the bars are mounted so that corresponding tines or prongs in adjacent bars will be likewise spaced substantially four inches apart.

Each pair of channel members 18, noting FIG. 9, is mounted on an end block 21 having an opening or bore 22 receiving a prong or tine member 20 for slight movement therein and in alignment or registering with the flange opening 19. A pin 23 located in a transverse aperture 24 of the prong or tine 20 prevents the prong from dropping out of the opening 22 and the slight movement permitted the prong in its mounting provides for greater prong durability with lessened prong breakage. The block 21 fits within the channel member and the assembly is maintained by means of bolts and nuts 25 (FIG. 8) extending through opening 26 in the block and opening 27 in the bar-forming channel members. The block 21 is provided with a cylindrical projection 28 forming a stub shaft which extends through an opening 29 in one of the drive wheel forming disks 17.

Between blocks 21 are spaced three intermediate blocks 30 (FIG. 3) with the assembly mounting the prongs the same as with the end blocks except that the blocks 30 are of equal length and breadth and consequently square instead of oblong and devoid of projection 28, there being 18 of the square blocks, three on each bar, and 12 of the end blocks or two on each bar.

The slightly movable prongs or tines are mounted so that they will be maintained in vertical position during the operation of the machine but with means being provided so that they may be moved to the horizontal or out of penetrating position when it is desired to move the machine over an area not desired to penetrate. In order to maintain the prongs or tines in such relation, on each of the end projections 28 is fixed an arm 31 having an opening 32 of a size snugly to receive the projection 28 and with each bar having a slot 33 extending to the end of the bar and with an opening 34 in which is received a bolt and nut 35 for clamping the projection 28 within the opening 32, the projection 28 having a key slot 28' and the bar 31 having a key slot 31' in which a key 36 is received for preventing relative rotation between the arm 31 and the projection 28. The arm 31 therefore becomes a crank by which the bar forming channel members carrying the prongs or tines can be rotated 90°. Since the end member 21 at the corresponding ends of the six bars carries such arms 31, a single control member 37 (FIG. 5) is provided for attachment to such arms 31 for maintaining the bars in a definite relation.

The control member 37 is in the form of a flat doughnut type ring provided with six equally spaced marginal openings 38 (FIG. 8) and with a bolt 39 located in each of such openings and having its threaded outer end engaged with threads 31" on the arm 31. The inner circular surface 37' of the ring 37 is mounted between opposed flanges 40' of a mounting disk 40 having an eccentric opening 41 in which the shaft 14 is received and by rotation of the member 40 about the shaft 14 the desired location of the prongs in either vertical or horizontal position may be accomplished.

The ring 37 and the wheel forming disks 17 connected by the arms 31 rotate in unison and when the member 40 is in one position the prongs will be vertically disposed and when it is in another position the prongs will be horizontally disposed. Means is provided for adjustably rotating the member 40 about the shaft 14, such means being in a form of a curved arm 42 having one end connected by a pivot bolt 43 with the member 40 and having its other end connected by a pivot 44 to an operating arm 45. The lower end of the operating ram 45 is connected by pivot 46 to the housing 10 and the upper end of said operating arm 45 has a control rod 47 attached thereto. By movement of the control rod the position of the prongs or tines can be changed between vertical and horizontal positions.

An internal combustion engine or other motor 48 is mounted by bolts 49 on top of the housing substantially directly over disks 17 and provides desirable added weight to, as well as a power plant for driving, the machine. While an internal combustion engine is illustrated, any type of motor or power plant may be employed. In order to drive the operating mechanism and to provide means whereby the drive may be made effective or not, a suitable transmission is provided. Illustrative of such transmission is the engine shaft 50 (FIG. 4) which drives a pulley 51 and by means of a belt 52 drives a much larger pulley 53 on a shaft 54. A sprocket 55 is mounted on the shaft 54 and drives a chain 56, and a larger sprocket 57 fixed to a shaft 58 drives a sprocket 59 and by means of a chain 60 drives a sprocket 61 fixed to shaft 14 mounting the disks 17 and aligned in a vertical plane transversely of the machine with the motor 48.

The shaft 14 rotates the drive wheel forming disks 17 which propel the machine forward with tendency to slip being eliminated by the prongs engaging the earth on which the machine is located.

The belt 52 is tightened or loosened by means of a roller 62 mounted on a pivoted arm 63 the operation of which is by lever 64 having an opening 64' in its end in which is located an operating rod 65 extending through a lever 66, such rod having a spring 67 cushioning the endwise movement of the rod. The rod 65 also is connected to an operating lever 68 mounted by a pivot 69 on a bracket 70 in such a manner that the right angular end 65' of the rod engages the bracket and forms a stop when the roller is moved to relieve the tightness of the belt. The lever 68 may be provided with a handle 68' for convenience of operation.

In order to control the direction of the machine a pair of hand grips 71 may be provided each mounted on a tubular handle bar 72 having its lower end key retained on a stud shaft 73. The handle bars may be reinforced by a brace 74 having a relatively wide connecting portion 74' between the upper ends of the handle bars and having its lower ends joined by pins 75 to lugs 76 fixed to the rear portion of the housing 10 of the machine.

The bracket 70 which carries the operating lever 68 and handle 68' is mounted on the handle bar 72, and the operating rod 47 for adjusting the positions of the prongs or tines is provided with a pivotal connection 77 cushioned by spring 78 to an operating lever 79 having a handle 79'. The operating lever 79 is mounted by a pivot 80 on a bracket 81 attached to the opposite or right handle bar 72. The speed of the internal combustion engine or motor may be controlled through a connection 82 in any desired form such, as for example, a flexible cable to an operating lever 83 mounted on a pivot 84.

It will be understood that the machine of the present invention is relatively simple, of practical and durable construction, and it will efficiently perform the function for which it was designed. Further, it will travel on the level or up or down an incline at a substantially uniform speed with minimum effort and attention on the part of an operator who need not be skillful or experienced.

The two-part prong or tine carrying bars described are preferred, although if desired instead of a pair of channel members bars 85 of solid square cross-section may be employed having openings 86 in which slightly different prongs 87 may be loosely mounted and held in position by means of cap screws 88 having their threaded portions engaged in the threaded openings 87' of the prongs 87. The prongs 87 are provided with collars or shoulders 89 and with tapered piercing points 90. The ends of the bars 85 are provided with projections 91 corresponding to the projections 28 of the preceding bar mounting illustrated in FIG. 9.

In the operation of the device handle 68' may be moved rearwardly (FIG. 1) to cause the roller 62 to press against the belt 52 to produce a positive drive of the drive wheel forming disks 17. The rotation of such wheel forming disks 17 will cause the prongs of each bar, carried by and between the opposed wheel forming disks when the handle 79' is retracted (FIG. 1), to be in vertical position and to engage and penetrate the earth sequentially with substantially vertical movement and without disturbing the adjacent soil or turf in which the perforations or holes are made.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. An aerating machine for producing cavities in the soil for the admission of air, moisture, and nourishment, said machine comprising,
   a housing having side and end portions and having an open bottom,
   co-axial bearing means mounted on said side portions in one end portion of said housing,
   shaft means rotatably supported in said bearing means and extending transversely of and within said housing,
   a pair of spaced ground-engaging support wheel means mounted on said shaft means to extend below the open bottom of said housing and into contact with the ground surface,
   said housing including means mounting auxiliary ground-engaging wheels longitudinally spaced from said wheel means and at the opposite and rearward end portion of said housing,
   a series of bars extending transversely of said housing and rotatably mounted in arcuately spaced parallel relation on and between said ground-engaging support wheel means,
   a plurality of spaced prongs mounted to extend from from one side of each of said bars,
   said housing surrounding and substantially enclosing said wheel means and said bars mounted thereon with said ground-engaging wheel means extending therebelow,
   manually controllable positioning means for said prongs including operating means mounted on said housing connecting said bars and of a construction when in one position of maintaining said prongs carried by said bars in earth-penetrating position generally downwardly and at right angles to the direction of travel of the machine and in another position in non-earth-penetrating position substantially in the direction of travel of the machine,
   said wheel means and said auxiliary wheels maintaining the open bottom of said housing at all times in substantially parallel spaced relation to the ground to effect a uniform depth and direction of soil penetration of said prongs when adjusted into said one position,
   motor means mounted on said housing substantially directly over said wheel means and shaft means and adding weight to said wheel means and to said prongs when they are in said soil-penetrating position,
   said motor means being connected to drive said wheel means whereby to propel the machine and cause soil penetration of said prongs,
   said spaced ground-engaging wheel means carrying the major portion of the weight of the machine.

2. A machine for producing cavities in the soil for the admission of air, moisture, and nourishment therein comprising,
   an open-bottomed housing,
      multiple ground-engaging wheels including support wheels coaxially spaced and rotatably mounted in a substantially enclosed relation in and supporting said housing in spaced relation to the ground,
      the remainder of said multiple wheels comprising auxiliary wheels longitudinally spaced from said wheels within said housing and maintaining the open bottom thereof parallel and relatively close to the ground surface,
   a series of hollow bars with inner chambers of generally rectangular section having the ends thereof journaled in the outer peripheral portions of said coaxially spaced ground-engaging support wheels within said housing and extending therebetween in angularly spaced substantially parallel relation,
   a plurality of spaced prongs mounted to extend from one side of each of said bars,
   a plurality of individual block means mounted in spaced relation in the inner chamber of and along each of said hollow bars for individually mounting each of said prongs within said bars for projecting laterally from one side thereof,
   manually operable bar adjusting means mounted on said housing connecting all of said bars and of a construction when in one position of adjustment maintaining the projecting prongs carried by said bars in operative position generally at right angles to the direction of travel of the machine with the prongs facing toward the ground and in another position with the prongs disposed inoperatively parallel to the surface of the ground being traversed,
   said wheel means and said auxiliary wheels maintaining the open bottom of said housing at all times in substantially parallel spaced relation to the ground to effect a uniform depth and direction of soil penetration of said prongs when adjusted in said one position,
   motor means mounted on said casing and over said bars to provide additional weight to alternately effect the said uniform depth of soil penetration and the withdrawal therefrom of said prongs when the bars are adjusted in said operative right angle position,
   said motor means being connected to rotatably drive said two wheels and said bars journaled therein.
   and means fixedly secured to said housing adjacent said auxiliary wheels for steering said machine and for controlling said bar adjusting means and said motor means.

3. An aerating machine as defined in claim 1 wherein said spaced parallel bars each comprise,
   a pair of channel members mounted in opposed facing relation with their respective flanges in close opposition to each other to thereby provide an elongated chamber within said bar,
   means individually mounting one end portion of each of said plurality of spaced prongs within said elongated chamber the opposite ends of said prongs being pointed,
   said individual spaced mounting means each having an opening receiving the said one end portion of said prongs for support therein,
   and passage means in opposed portions of said channel flanges on the one side of said bar for permitting said prongs to extend from the said one side of said bar.

4. An aerating machine as defined in claim 1 wherein each of said bars comprises,
   a pair of channel members having their flanges mounted in opposed facing relation to form an elongated bar chamber of generally rectangular section therebetween.
   means individually and slightly movably mounting an end portion of each of said plurality of spaced prongs within said elongated bar chamber,
   passage means in opposed portions of said channel flanges on the one side of said bar for permitting said prongs to extend from the said one side of said bar,
   said individual mounting means within said elongated bar chamber comprising a plurality of spaced blocks of generally square section, abutment means on each of said prongs and abutting against a surface of its associated mounting block to prevent the prong from dropping out of said associated mounting block within said elongated bar chamber, the inner end of each of said prongs abutting against portions of said flanges on the opposite side of said bar whereby the latter receives the thrust exerted on said prongs when penetrating the soil.

5. An aerating machine as defined in claim 1 wherein each of said prong-mounting bars comprises, a pair of channel members disposed in opposed facing relation with their flanges in closely adjacent opposition to each other to form an enclosure therebetween, end members secured to and closing the ends of said enclosure between said channel members to form an elongated chamber therein of generally rectangular section, a plurality of block members mounted in spaced relation within said elongated chamber for individually mounting said prongs in said spaced relation within the latter, said end members each mounting a prong for slight movement therein and also forming a trunnion for rotatably supporting said bar in said pair of earth-engaging wheels, said end members including means for connecting each of said bars to said adjusting means for effecting the rotation thereof about its own axis, said end members comprising a part of said plural spaced means for mounting said prongs, said slightly movable mounting of said prongs providing greater prong durability with lessened danger of breakage.

6. An aerating machine as defined in claim 1 wherein, each of said spaced prong members is removably mounted in individual bore means extending transversely through each of said bars, readily removable abutment means securing said prongs in position in said bore means of said bars, and manipulating handle means secured to said housing adjacent said auxiliary wheels and having means mounted thereon for controlling said prong adjusting means and said motor means.

References Cited in the file of this patent

UNITED STATES PATENTS

| | | |
|---|---|---|
| 38,676 | Grabo | May 26, 1863 |
| 872,562 | Hibler | Dec. 3, 1907 |
| 2,041,208 | Rienks | May 19, 1936 |
| 2,042,597 | Hargreaves | June 2, 1936 |
| 2,645,987 | Brooks | July 21, 1953 |
| 2,768,570 | Strid | Oct. 30, 1956 |